(12) United States Patent
Cabo

(10) Patent No.: US 11,170,745 B1
(45) Date of Patent: Nov. 9, 2021

(54) QUICK-RELEASE CLAMP FOR RELEASABLY ATTACHING AN INSTRUMENT, ESPECIALLY A PERCUSSION INSTRUMENT, TO A STAND

(71) Applicant: SONOR GmbH, Bad Berleburg (DE)

(72) Inventor: Hernán Javier Cabo, Trossingen (DE)

(73) Assignee: SONOR GmbH, Bad Berleburg (DE)

( * ) Notice: Subject to any disclaimer, the term of this patent is extended or adjusted under 35 U.S.C. 154(b) by 0 days.

(21) Appl. No.: 17/178,714

(22) Filed: Feb. 18, 2021

(30) Foreign Application Priority Data

Dec. 17, 2020 (DE) ...................... 10 2020 134 006.0

(51) Int. Cl.
*G10D 13/10* (2020.01)
(52) U.S. Cl.
CPC ..................... *G10D 13/28* (2020.02)
(58) Field of Classification Search
CPC ............ G10D 3/12; G10D 3/153; G10D 3/04; G10D 1/08
See application file for complete search history.

(56) References Cited

U.S. PATENT DOCUMENTS

| | | |
|---|---|---|
| 6,884,015 B1 | 4/2005 | Takegawa |
| 7,629,526 B1 | 12/2009 | Miyajima |
| 10,415,618 B2 | 9/2019 | Kadosh |
| 10,504,495 B1 * | 12/2019 | Pawlovich ............ G10D 13/11 |
| 2014/0227021 A1 | 8/2014 | Kamen et al. |

* cited by examiner

*Primary Examiner* — Kimberly R Lockett
(74) *Attorney, Agent, or Firm* — Smartpat PLC

(57) ABSTRACT

A quick-release clamp for releasably attaching an instrument, in particular a percussion instrument, to a stand includes a passage opening for the stand, at least one movable clamping jaw for changing a cross-section of the passage opening, an operating element for influencing a position of the clamping jaw, and a housing. In the rest position of the at least one clamping jaw there is a form-fit connection between the at least one clamping jaw, the operating element and the housing to prevent the movement of the clamping jaw.

12 Claims, 1 Drawing Sheet

QUICK-RELEASE CLAMP FOR RELEASABLY ATTACHING AN INSTRUMENT, ESPECIALLY A PERCUSSION INSTRUMENT, TO A STAND

TECHNICAL FIELD

The disclosure relates to a quick-release clamp for releasably attaching an instrument, in particular a percussion instrument, to a stand.

BACKGROUND

When different instruments, in particular percussion instruments, are used simultaneously by a musician, it can be helpful for the musician if those are attached to a frame or a stand. For reasons of flexibility in the setup of the percussion instruments, releasable fastenings are usually detachably attached. In the field of concert technology, care is also taken to ensure that an instrument is quickly attached to or removed from a stand, as this reduces the time required for setup and tear down.

Various clamps or fastening means suitable for this purpose are disclosed in the prior art. For example, U.S. Pat. No. 6,884,015 B1 discloses a clamp in which two clamping wings are attached to a base body. These clamping wings are pivotable with respect to the base body and can be locked by moving the pivot axis horizontally. The disadvantage of this design is that one-handed operation is not possible or only possible with great difficulty, or more than one movement is necessary to attach the clamp to the holder.

Another type of clamp is known from U.S. Pat. No. 7,629,526 B1. The clamp has two clamping elements which are supported by springs against the housing of the clamp. Furthermore, these clamping elements simultaneously form the operating elements. By actuating the control surfaces on the outside of the clamp, the surfaces are removed from one another, thereby increasing the cross-section of the passage opening and releasing the connection. The disadvantage of such an embodiment is that the support takes place by means of the springs. As a result, the clamping forces are dependent on the respective spring force of the springs used. Particularly in the case of heavy loads or oscillating loads, the clamping connection can come loose if the spring force is exceeded. Furthermore, in the described embodiment it is necessary to actuate two control surfaces in order to release a clamping connection.

SUMMARY

An object of the disclosure is therefore to further improve known types of clamps in such a way that the operation of the quick-release clamp is simplified and the clamping reliability is not reduced in the process.

The object is achieved by a quick-release clamp as claimed. In the rest position of the clamping jaw there is a form-fit connection between the clamping jaw, the operating element, and the housing. This prevents the clamping jaw from moving in relation to the passage opening within the housing and thus prevents an unintentional widening of the cross-section and a loosening of a connection between the clamp and the stand.

A spring is arranged between the housing and the operating element. The spring holds the operating element in a position through which the clamping jaw can be brought into the rest position and/or locked. No force from the spring acts directly on the clamping jaw. To secure against unintentional loosening of the connection, it is sufficient that the position of the operating element is held by the spring.

The operating element is movable with respect to the housing and the clamping jaw. Thereby it possible to release the form-fit connection between the clamping jaw, the operating element, and the housing. This allows the clamping jaw to be moved into a released position. The clamping reliability of the connection increases because the spring acts directly only on the operating element and the form-fit connection is released only when the operating element is moved.

It is preferred if the form-fit and/or force-fit can be brought about in the rest position of the clamping jaw without the action of a spring force by the spring. This has the advantage that the holding forces, i.e. the maximum transferable clamping forces, can be adjusted independently of the spring force that is necessary for positioning the operating element.

The form-fit connection between the clamping jaw, the operating element, and the housing is preferably suitable for transferring a force from the surface of the clamping jaw onto the housing. Parallel surfaces that are as flat as possible are preferred, since this does not restrict a relative movement between the components.

At least two clamping jaws are preferably present and the form-fitting connection between the operating element, the housing, and the at least two clamping jaws in the rest position is established by a single operating element. In this embodiment, the handling of the quick-release clamp is simplified as the operating element acts on two clamping jaws at the same time and two clamping jaws can easily produce a safe cross-section reduction for connection to a stand.

At least one clamping jaw is preferably mounted so as to be pivotable about a common axis parallel to the passage opening. Such a structure simplifies the construction and the absorption of holding forces by the clamping jaws, since forces can be diverted into the housing at two points, namely at the pivot bearing and the operating element.

The operating element preferably has a first portion for establishing the force-fit and/or form-fit and a second portion, whereby the clamping jaws can be moved relative to the housing when the operating element is moved and the cross-section of the passage opening between the clamping jaws changes as a result. As a result, the position of the clamping jaw can advantageously be influenced with an operating element or a movement of the operating element and a corresponding form-fit and/or force-fit can be generated.

In the rest position, the cross-section between the clamping jaws is preferably minimal. This simplifies the operation for the user and the operational reliability, because in the starting position there is always a form-fitting and/or force-fitting position.

The possible directions of movement of the operating element and the clamping jaw in the event of a change in cross-section are preferably not aligned parallel to one another. The non-parallel directions of movement of the different components increase the reliability of the connection because forces or movements for changes in cross-section through the clamping jaws do not point in the possible directions of movement of the operating element. As a result, no movement or only a movement that is insufficient for releasing the quick-release clamp can be transmitted to the operating element due to an unwanted movement or force input into a clamping jaw.

In the rest position of the clamping jaws and the operating element connected to them, the spring force between the operating element and the housing preferably acts perpendicular to the passage opening and not in possible directions of movement of the clamping jaws. This increases the securing effect of the spring, which holds the operating element in the rest position, because there are different directions of movement and force between the clamping jaws and the operating element.

It is also preferred if the at least one clamping jaw has a clamping surface with a structured surface. The structured surface can be incorporated into the clamping jaw body itself or applied by a further layer. Structured here means that there is a haptically perceptible structure on the surface, which preferably makes it more difficult for the clamp to move relative to the stand and/or increases the friction between the two.

The structured surface preferably has notches perpendicular to the passage opening. Perpendicular notches can be, for example, rectangular, triangular or round milled depressions or raised areas with respect to the surface. These can be produced, for example, by a rubber-like glued-on layer. A hard structuring of the surface is preferred if the stand also has a hard surface structuring.

A system of a quick-release clamp and a stand includes the quick-release clamp as presented before. The clamping surface of at least one clamping jaw and a part of the surface of the stand have complementary structuring. Due to the complementary surface profile, the surfaces can interlock. This increases the fastening reliability of the clamp on the stand.

DETAILED DESCRIPTION

The invention is described in detail below with reference to the figures mentioned in the form of exemplary embodiments. In all figures, the same technical elements are provided with the same reference symbols.

Figure 1:
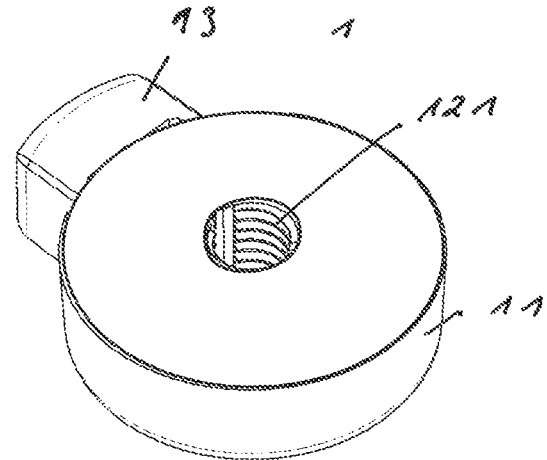
FIG. 1 is an external view of a quick-release clamp.

FIG. 1 shows an exterior view of a quick-release clamp 1. A round outer housing 11, a passage opening 14 for a stand 2 and an operating element 13 are shown in a rest position. In the passage opening 14, a part of a clamping jaw 12 can be seen, which reduces the cross-section of the passage opening 14 in the quick-release clamp 1.

Figure 2:
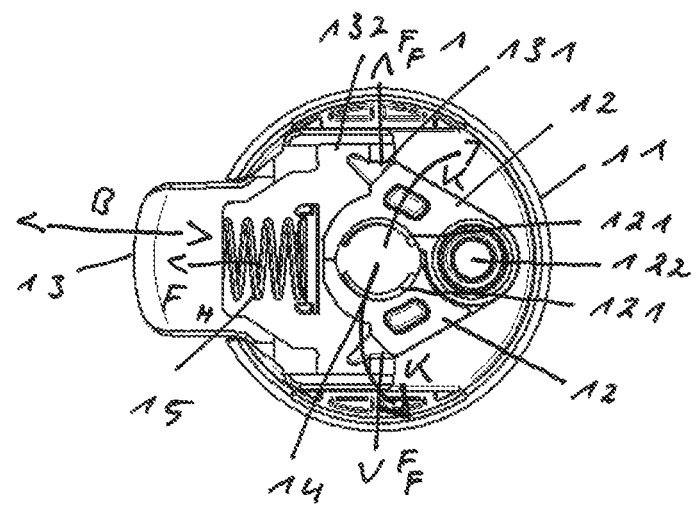
FIG. 2 is a horizontal section through the quick-release clamp in rest position.

FIG. 2 shows a horizontal section through a quick-release clamp 1. The quick-release clamp 1 and its operating element 13 are in the rest position. A spring 15 in the form of a helical spring is arranged between the housing 11 and the operating element 13 and pushes the operating element 13 outwardly against the wall of the housing 11. The two clamping jaws 12 reach around the passage opening 14 and include an additional structured layer on the respective clamping surface 121. The clamping jaws 12 themselves are both mounted pivotably about an axis 122 which extends parallel to the passage opening 14.

In the rest position shown in FIG. 2, the cross-section of the passage opening 14 is reduced by the two clamping jaws 12 and there is a form fit between the clamping jaw 12, operating element 13 and housing 11. Moving the operating element in direction B towards the passage opening 14 in housing 11 shifts the portion of the operating element 13 which produces the form fit relative to the clamping jaw 12 and the housing 11 and thus releases the form fit. The clamping jaw 12 can then rotate about the pivot axis 122 and thereby enlarge the cross-section and release a possible connection to a stand.

Figure 3:
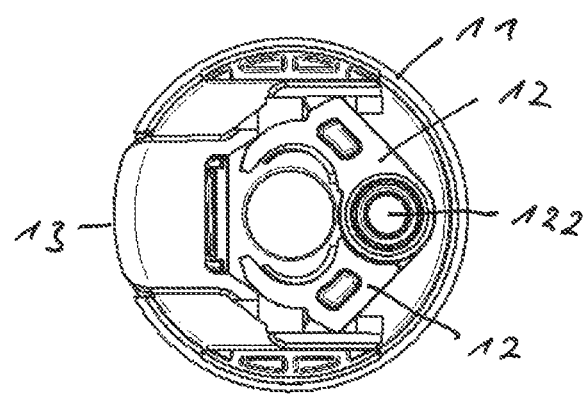
FIG. 3 is a horizontal section through the quick-release clamp in the released position.

FIG. 3 shows a quick-release clamp 1 with the operating element 13 in the released position. Due to the corresponding design of the operating element 13, both clamping jaws 12 move at the same time during the movement B of the operating element 13. The movement K of the clamping jaws 12 about the bearing or axis 122 of the clamping jaws 12 is only possible when the corresponding form fit has been released. The operating element 13 then pushes both clamping jaws 12 outwardly so that the cross-section in the passage opening 14 increases. A possible connection with a stand is thereby released.

REFERENCE NUMBER

1 Quick-release clamp
11 Housing
12 Clamping jaw
121 Clamping surface
122 Axis of rotation of the clamping jaws with bearing
13 Operating element
131 Form-fit area
132 Release area
14 Passage opening
15 Spring element
B Direction of movement of operating element
K Direction of movement of the clamping j aw
$F_F$ Spring force
$F_H$ Holding forces

The invention claimed is:

1. A quick-release clamp (1) for releasably attaching an instrument to a stand, the quick-release clamp (1) comprising:
    a passage opening (14) for the stand;
    at least one movable clamping jaw (12) for changing a cross-section of the passage opening (14);
    an operating element (13) for influencing a position of the at least one clamping jaw (12); and
    a housing (11),
    wherein the at least one clamping jaw (12) is adjustable between a released position and a rest position,
    wherein in the rest position of the at least one clamping jaw (12) there is a form-fit connection between the at least one clamping jaw (12), the operating element (13) and the housing (11) to prevent movement of the at least one clamping jaw (12);
    wherein a spring element (15) is arranged between the housing (11) and the operating element (13) to hold the operating element (13) in a position through which the at least one clamping jaw (12) can be brought into the rest position and/or locked and no force input directly acts from the spring element (15) onto the at least one clamping jaw (12); and
    wherein the operating element (13) is movable relative to the housing (11) and the at least one clamping jaw (12) to separate the form-fit connection between the at least one clamping jaw (12), the operating element (13) and the housing (11) and to enable the at least one clamping jaw (12) to move into the released position.

2. The quick-release clamp according to claim 1,
wherein the form-fit connection in the rest position of the at least one clamping jaw (12) is effected without action of a spring force ($F_F$) by the spring element (15).

3. The quick-release clamp according to claim 1,
wherein the form-fit connection between the at least one clamping jaw (12), the operating element (13) and the housing (11) is suitable for deriving a holding force ($F_H$) from a surface of the at least one clamping jaw (12) onto the housing (11).

4. The quick-release clamp according to claim 1,
wherein the at least one clamping jaw (12) comprises at least two clamping jaws (12); and
wherein the form-fit connection between the operating element (13), the housing (11) and at least two clamping jaws (12) in the rest position is effected by a single operating element (13).

5. The quick-release clamp according to claim 4,
wherein the at least two clamping jaws (12) can be rotated about a common axis (122) which extends parallel to the passage opening (14).

6. The quick-release clamp according to claim 4,
wherein the operating element (13) has a first portion for producing the form-fit connection (131); and
wherein the operating element (13) has a second portion (132) by which, when the operating element (13) is moved, the at least two clamping jaws (12) are moved relative to the housing (11) and the cross-section of the passage (14) between the at least two clamping jaws (12) is adjusted.

7. The quick-release clamp according to claim 1,
wherein in the rest position the cross-section between the at least two clamping jaws (12) is minimal.

8. The quick-release clamp according to one of claim 4,
wherein movement directions of the operating element (13) and the at least two clamping jaws (12) are not parallel to one another when the cross-section changes.

9. The quick-release clamp according to claim 4,
wherein, in the rest position, a spring force ($F_F$) between the housing (11) and the operating element (13) is perpendicular to a holding force ($F_H$) which can be transmitted to the housing by the form-fit connection.

10. The quick-release clamp according to claim 1,
wherein the at least one clamping jaw (12) has a clamping surface (121) formed as an additional layer with a structured surface.

11. The quick-release clamp according to claim 10,
wherein the structured surface has notches perpendicular to the passage opening.

12. A system, comprising:
the quick-release clamp (1) as in claim 10; and
a stand for an instrument,
wherein the clamping surface (121) of the at least one clamping jaw (12) and part of a surface of the stand have structures that are complementary to one another.

* * * * *